US006978952B2

(12) United States Patent
Kost et al.

(10) Patent No.: US 6,978,952 B2
(45) Date of Patent: Dec. 27, 2005

(54) SAND/SALT SPREADER

(75) Inventors: James A. Kost, Willoughby, OH (US); Josh Vyrostek, Willoughby Hills, OH (US)

(73) Assignee: The Louis Berkman Company, Steubenville, OH (US)

( * ) Notice: Subject to any disclaimer, the term of this patent is extended or adjusted under 35 U.S.C. 154(b) by 108 days.

(21) Appl. No.: 10/755,211

(22) Filed: Jan. 12, 2004

(65) Prior Publication Data

US 2004/0140377 A1 Jul. 22, 2004

Related U.S. Application Data

(62) Division of application No. 10/207,705, filed on Jul. 26, 2002, now Pat. No. 6,722,590.

(60) Provisional application No. 60/361,889, filed on Mar. 5, 2002.

(51) Int. Cl.[7] ....................... A01C 15/00; A01C 17/00; A01C 19/00; A01C 3/06; A01C 7/00

(52) U.S. Cl. ...................... 239/668; 239/661; 239/675; 239/681; 239/683; 239/684; 239/687; 224/519

(58) Field of Search ................................ 239/668, 661, 239/675, 681, 683, 684, 687, 650, 651, 672, 239/677, 680; 222/166, 237, 240; 224/404, 224/500, 519, 512, 513, 518, 520, 521; 280/415.1, 280/416.2

(56) References Cited

U.S. PATENT DOCUMENTS

| | | | | |
|---|---|---|---|---|
| 2,886,334 | A * | 5/1959 | Presler | 239/661 |
| 3,374,956 | A | 3/1968 | Brazilli et al. | |
| 3,819,120 | A | 6/1974 | Walker | |
| 4,166,581 | A | 9/1979 | Hetrick | |
| 4,169,559 | A | 10/1979 | McKee | |
| 4,753,376 | A * | 6/1988 | Tulio | 224/537 |
| 5,375,773 | A | 12/1994 | Lewis | |
| 5,485,963 | A | 1/1996 | Walto et al. | |
| 5,501,405 | A * | 3/1996 | Doornek | 239/683 |
| 5,988,534 | A | 11/1999 | Kost et al. | |
| 6,089,478 | A | 7/2000 | Truan et al. | |
| 6,422,490 | B1 | 7/2002 | Truan et al. | |
| 6,502,771 | B1 * | 1/2003 | Wyne | 239/663 |

* cited by examiner

*Primary Examiner*—David A. Scherbel
*Assistant Examiner*—Darren Gorman
(74) *Attorney, Agent, or Firm*—Fay, Sharpe, Fagan, Minnich & McKee, LLP

(57) ABSTRACT

An improved spreader assembly adapted to be mounted on a vehicle having a tailgate and a bumper. The improved spreader assembly includes a hopper and a retaining arrangement. The hopper has an upper section and a bottom section. The bottom section has a base surface adapted to at least partially rest on a top surface of the bumper. The retaining arrangement includes a band that fits at least about a portion of a front face of the upper section of the hopper. One end of the band is adapted to connect to the vehicle to maintain at least a portion of a back face of the upper section at least closely adjacent to the tailgate of the vehicle.

41 Claims, 10 Drawing Sheets

FIG. 2A
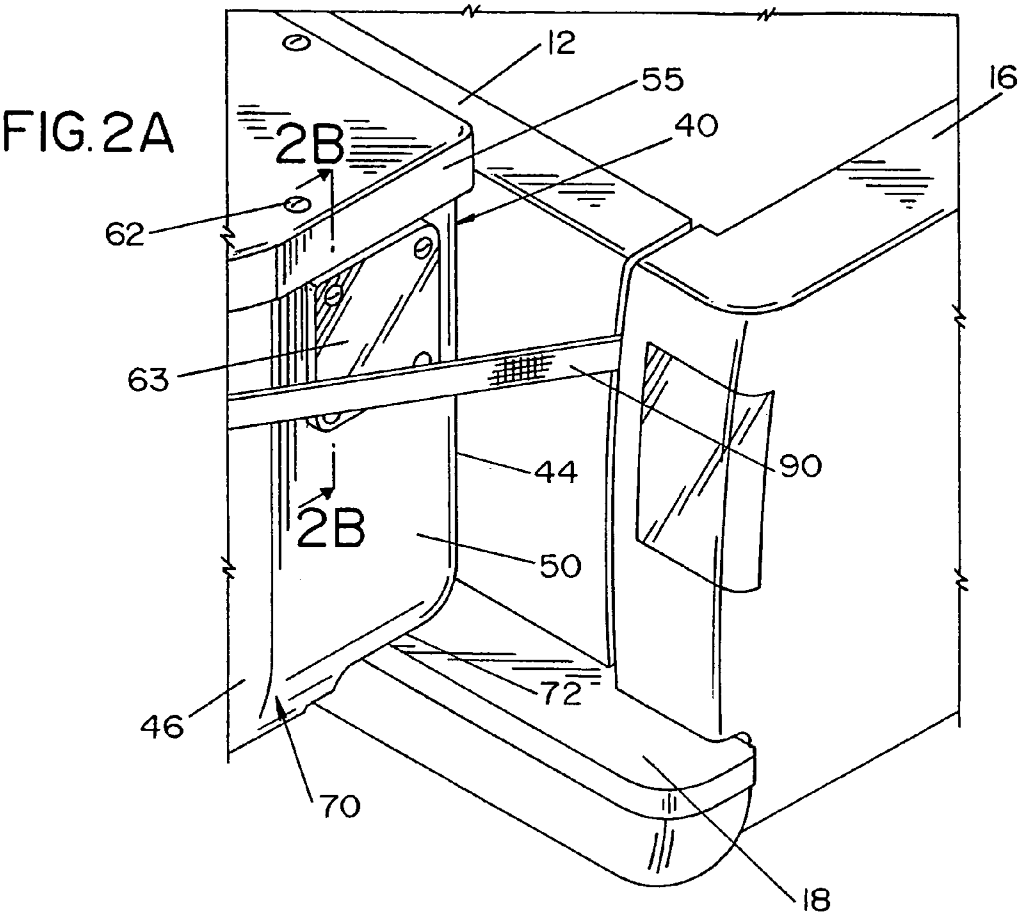
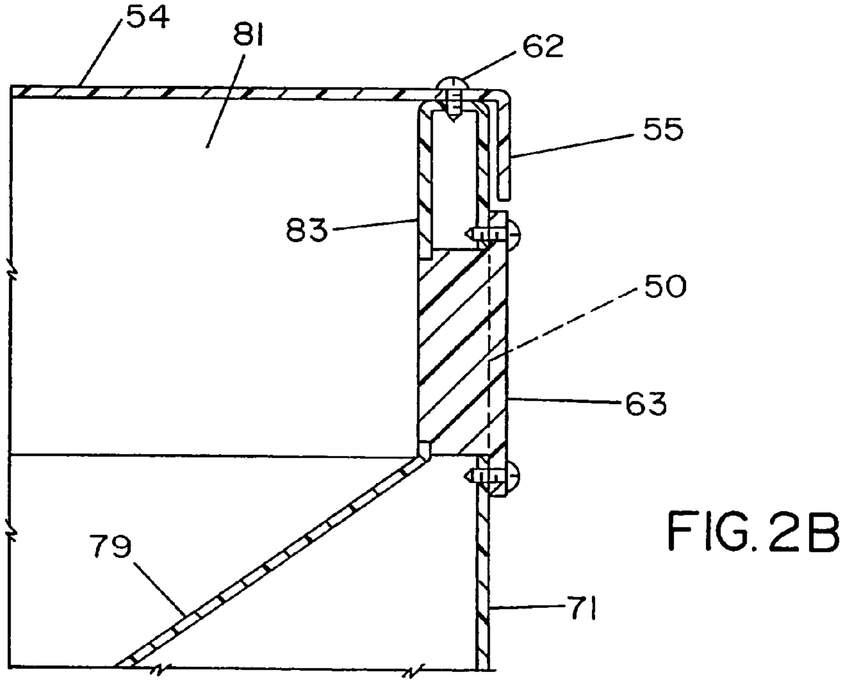
FIG. 2B

SAND/SALT SPREADER

The present invention is a division of U.S. Ser. No. 10/207,705, which was filed on Jul. 26, 2002, now U.S. Pat. No. 6,722,590 and remains pending. That application, in turn, claims priority on U.S. Provisional Application Ser. No. 60/361,889, filed Mar. 5, 2002 entitled "Sand/Salt Spreader," which is incorporated herein by reference. This invention relates to the art of spreading particulate material and more particularly, to an improved mounting assembly for mounting a spreader onto a vehicle.

BACKGROUND OF THE INVENTION

Salt and/or sand spreading is a common practice to maintain roads during the winter months. Over the years, private businesses have become involved in road, driveway and parking lot maintenance in the form of removing snow from such areas and spreading of salt and/or sand on such areas. Private businesses typically use pickup trucks to perform this type of service. In the past, numerous types of salt spreaders have been developed to be attached to conventional vehicles. Typically, the spreader is mounted on the rear of the vehicle to spread particulate material, such as salt, sand, cinders, etc. onto the surface being traveled by the vehicle. One of the more common spreaders employs a hopper having a lower discharge opening through which the particulate material falls onto a rotating spreader element. Such a spreader is known as a broadcast spreader. By rotating the spreader element as material is being discharged onto the spreader element, the particulate material is centrifugally propelled by the spreader element in a wide pattern onto the ground surface. Typically, a motor is mounted on the spreader to cause the spreader element to rotate. In some instances, the spreader element is supported on a motor-driven shaft which protrudes upwardly into the hopper to break up conglomerations of material and to agitate the material in the hopper for better feeding through the discharge opening.

Typical spreader mount assemblies used in conjunction with pick-up trucks have fastened the spreader to the truck's rear bumper or tailgate. The usual procedure is that the spreader is secured to the truck in a fixed position by the use of bolts and brackets. Due to the relative difficulty in installing the assembly, such assemblies are left on during the spreading season and are not removed until the season ends. One such mount configuration is disclosed in Assignee's U.S. Pat. No. 4,166,581, which is incorporated herein by reference. Another available configuration includes the use of brackets which slide over the tailgate, and incorporates a frame which rests on the vehicle's bumper. A spreader mounting assembly disclosed in U.S. Pat. No. 5,375,773, which is incorporated herein by reference, includes a frame which attaches to the vehicle and includes pivoting connections between the frame of the vehicle so that the frame can be swung horizontally, thereby permitting access to the tailgate of vehicle. Although these spreader mounting assemblies can successfully mount a spreader to a vehicle and were an improvement over many of the prior spreader mounting assemblies, there remained several disadvantages associated with such mounting assemblies. Once such disadvantage is that the frame which supports the hopper and spreader must be made of heavy-gauge steel to support a hopper filled with particulate material as it is being swung from the tailgate of the vehicle. The heavier materials which must be used for the construction of the frame result in additional costs and difficulty in moving the frame by an operator. Another disadvantage is that the mounting bracket for the mounting assembly must be bolted to the top of the side wall of the vehicle. As a result, bolt holes must be drilled into the top of each of the side walls to secure the bracket to the top of the side walls. The resulting holes permanently disfigure the vehicle and can result in rusting of the vehicle around the drilled bolt holes. A further disadvantage of the spreader mounting assembly is that the outer surface of the tailgate can be damaged if the tailgate is not properly closed prior to the frame being secured to the rear of the vehicle. Another disadvantage is that the spreader assembly is not easily adaptable to a variety of differing width cargo beds, thereby limiting the utility of such mounting assembly to specific size trucks.

Many of the deficiencies of past mounting assemblies were overcome by Assignee's U.S. Pat. No. 5,988,534, which is incorporated herein by reference. The '534 patent disclosed a spreader gate attached to the rear of a vehicle and designed to substantially close an opening between the two side walls of a cargo bay. A gate connector was provided to pivotally move the spreader gate about a substantially vertical axis, thereby enabling the spreader gate to be swung away from the cargo bed. A spreader mount was also provided which was connected to the spreader gate and extended rearwardly therefrom. The hopper mount was designed to support a hopper. The spreader gate was designed to be substituted for the original tailgate of the vehicle. As a result, the original vehicle tailgate was removed prior to installing the spreader gate. The spreader gate was then installed and was designed to close the opening between the two side walls of the cargo bay without the need of the original tailgate. The elimination of the original vehicle tailgate allowed an operator to easily gain access into the cargo bay by merely swinging open the spreader gate. Since the spreader gate did not need to be swung completely open for an operator to access the cargo bed of the vehicle, only a minimum amount of movement of the spreader gate was required to allow an operator to gain easy access to the cargo bay area of the vehicle. The spreader gate also did not require a significant amount of space for opening to allow an operator to gain access to the cargo bay area. The use of the spreader gate allowed an operator to conveniently transfer particulate material from the cargo bed into a hopper mounted on the spreader gate. The '534 patent also disclosed a spreader gate that included a plurality of sections to enable the length of the spreader gate to be adjusted for use in a variety of tailgate configurations. The spreader gate accommodated the wide variety of widths of tailgates on various types of vehicles. The '534 patent further disclosed a gate connector that was positioned rearwardly of the cargo bed to allow the spreader gate to be easily swung away from the cargo bed. A portion of the gate connector was mounted onto the rear bumper of the vehicle such as by brackets and/or by inserting bolt holes into the rear bumper. The gate connector also included a connector flange which was secured to the inner surface of the side wall of the cargo bay such as by clamps and/or bolts.

Although the spreader gate overcame many of the deficiencies of prior spreader gates, the spreader gate still required some modest modifications and alterations to the rear of the vehicle. In addition, the tailgate of the vehicle had to be stored until the spreader gate was removed. Some operators of vehicles that only periodically used the spreader remained dissatisfied that their vehicle had to be disfigured due to one or more components of the spreader gate having to be mounted to vehicle bumper and cargo bay by use of bolts or other types of connectors. In addition, some operators were dissatisfied that the tailgate had to be removed before the spreader gate could be installed. The removal of the tailgate and/or mounting of one or more components of the spreader gate to the vehicle required some vehicle owners to seek professional installation. Furthermore, vehicle owners that use SUVs and/or jeeps typically could not use spreader mounts, since such mounts were designed primarily for pickup trucks.

In view of the deficiencies of the present spreader mounting assemblies, there remains a need for a spreader mounting assembly that is easy to install, which minimizes the amount of disfigurement to a vehicle, and which can be used in a wide variety of vehicles.

SUMMARY OF THE INVENTION

The present invention relates to an improved spreader mounting assembly to support a spreader at the rear of the vehicle, and more particularly, to an improved spreader assembly which is easy to install, which minimizes the amount of disfigurement to a vehicle, and which can be used on a wide variety of vehicles.

In accordance with the invention, there is provided a spreader which is attached to the rear of a vehicle without having to substantially modify the existing structure of the vehicle. The basic design of the spreader includes a hopper which can hold a particulate material (e.g. salt, sand, ash, gravel, calcium carbonate, other deicing agents, etc.) and a retaining arrangement that retains the hopper on the rear of the vehicle. In one embodiment of the invention, the hopper includes an upper section and a bottom section. The upper section is at least partially designed to contain a volume of particulate material. The bottom section includes a hopper chute that is at least partially designed, to direct particulate material toward an opening in the base of the bottom section. In one aspect of this embodiment, the upper section includes at least one sealable opening to allow particulate material to be inserted into the interior of the hopper. In one non-limiting design, an opening is located in the top surface of the upper section; however, one or more openings can be located in other locations on the upper section. In another and/or alternative non-limiting design, the opening is substantially circular; however, other shapes of the opening can be used. In still another and/or alternative non-limiting design, the opening is positioned substantially in the center of the top surface of the upper section. In another and/or alternative aspect of this embodiment, at least one opening is sealable by a removable cap. In one non-limiting design, the removable cap is threaded into the opening; however, many other or additional arrangements can be used to removably connect the cap to the opening (e.g. latch, VELCRO, snap, lock, clip, etc.). In another and/or alternative non-limiting design, the removable cap includes a gripping arrangement to enable an operator to at least partially grasp the removable cap and insert and/or remove the cap from the opening. Such gripping arrangement can include, but is not limited to, grooves, ridges, rough surfaces, notches, and/or the like. In still another and/or alternative aspect of this embodiment, the upper section includes at least one viewing location that can be used to visually determine the amount of particulate material in the upper section of the hopper. The viewing section allows an operator to easily and conveniently determine particulate material levels in the hopper without having to open the hopper. In one non-limiting design, the viewing location includes a clear or semi-clear material such as, but not limited to, glass, plastic, etc. In yet another and/or alternative aspect of this embodiment, the upper section is made of a durable and corrosion resistant material. Such material includes, but is not limited to, corrosion resistant metals (e.g. aluminum, stainless steel, coated steels, etc.), plastic materials, rubber materials, and the like. In one non-limiting design, the upper section includes linear low-density polyethylene (LLDPE). In still yet another and/or alternative aspect of this embodiment, the upper section includes a removable top surface. The removable top surface allows access to the internal components of the hopper. When the top surface includes an opening used to refill the hopper with particulate material, the removable top is typically not used to refill the hopper with particulate material; however, the removable top can be removed to fill the hopper. When an opening is not included in the top surface, the removable top can be used to refill the hopper with particulate material. In one non-limiting design, the removable top can be secured to the upper section by a variety of arrangements such as, but not limited to, screws, bolts, latches, clips, straps, pins, rivets, etc. In another and/or alternative non-limiting design, the removable top is made of a durable and corrosion resistant material. Such material includes, but is not limited to, corrosion resistant metals (e.g. aluminum, stainless steel, coated steels, etc.), plastic materials, rubber materials, and the like. In still another and/or alternative non-limiting design, the removable top is made of a material similar to the upper section of the hopper. In a further another and/or alternative aspect of this embodiment, the bottom section is made of a material that is the same or similar to the material used for the upper section. In one non-limiting design, at least a portion of the upper and bottom section of the hopper is formed and/or molded together. In a further and/or alternative aspect of this embodiment, the upper section and/or bottom section of the hopper is at least partially formed by a multiple layer wall configuration. The multiple wall layers provide additional structural support to the hopper. In one non-limiting design, the walls of the hopper are formed of two wall layers. In another and/or alternative embodiment of the invention, the retaining arrangement is designed to at least partially secure and support the hopper on the rear of a vehicle without having to substantially modify the vehicle. In one aspect of this embodiment, the retaining arrangement at least partially secures and supports the hopper on the rear of a vehicle without having to remove the tailgate of the vehicle. In another and/or alternative aspect of this embodiment, the retaining arrangement at least partially secures and supports the hopper on the rear of a vehicle without having to drill holes, cut and/or otherwise disfigure the bumper of a vehicle. In still another and/or alternative aspect of this embodiment, the retaining arrangement at least partially secures and supports the hopper on the rear of a vehicle without having to drill holes, cut and/or otherwise disfigure the cargo area or trunk of a vehicle. In yet another and/or alternative aspect of this embodiment, the retaining arrangement at least partially secures and supports the hopper on the rear of a vehicle without having to drill holes, cut and/or otherwise disfigure the tailgate of a vehicle. In still yet another and/or alternative aspect of this embodiment, the retaining arrangement removably secures the hopper on the rear of a vehicle. In a further and/or alternative aspect of this embodiment, the retaining arrangement does not require the drilling mounting holes in a vehicle to secure the hopper on a vehicle. In one non-limiting design, the retaining arrangement is at least partially secured to one or more existing components of a vehicle without having to substantially modify the one or more existing components. Such existing components include, but are not limited to, luggage racks, tailgate pins, tailgate locks, existing openings in the walls of a truck bed, etc. In still a further and/or alternative aspect of this embodiment, the retaining arrangement does not require the use of a spreader frame to support the hopper on a vehicle. In one non-limiting design, the retaining arrangement does not require the use of a welded spreader frame to support the hopper on a vehicle.

In accordance with another and/or alternative aspect of the invention, the hopper is at least partially designed to be at least partially supported on the bumper of a vehicle such that at least a portion of the hopper at least partially rests closely adjacent to or against the face of the vehicle tailgate. In one embodiment of the invention, at least a portion of the bottom section of the hopper is designed to rest upon the top surface of a vehicle bumper. This design results in a substantial amount of the weight of the hopper to be supported by the bumper of the vehicle. In one aspect of this embodiment, the bottom section includes a substantially flat planar surface that is adapted to rest on the top surface of a bumper. In another and/or alternative embodiment of the invention, at least a portion of the bottom section of the hopper and/or top surface of the bumper includes a gripping surface that is designed to at least partially grip the top surface of a vehicle bumper. In one aspect of this embodiment, the gripping surface includes a rubber material or the like. In another and/or alternative aspect of this embodiment, the gripping surface includes a rough surface. In still another and/or alternative aspect of this embodiment, the gripping surface can be permanently formed on or connected to the bottom section of the hopper and/or the top surface of the bumper. In yet another and/or alternative aspect of this embodiment, the gripping surface can be removably connected to the bottom section of the hopper and/or the top surface of the bumper. In another and/or alternative embodiment of the invention, at least a portion of the back surface of the upper section of the hopper is substantially flat or planar to facilitate in at least a portion of the back surface contacting and resting against the face of the vehicle tailgate and/or being portioned closely adjacent to the vehicle tailgate. In still another and/or alternative embodiment of the invention, a material can be used to protect the vehicle from damage such as, but not limited to, scratching and/or denting when the hopper is secured to the vehicle. In one aspect of this embodiment, the material is a non-abrasive or low abrasive material such as, but not limited to, rubber, foam, natural fiber material (e.g., cotton, wool, linen, etc.), man-made fiber material (e.g., nylon, rayon, polyester, etc.), and/or the like. In another and/or alternative aspect of this embodiment, the material can be permanently secured to the hopper, removably secured to the hopper, or be a separate component from the hopper. In still another and/or alternative aspect of this embodiment, the material is used to protect the bumper and/or tailgate of the vehicle. In one non-limiting design, the material is at least partially positioned between at least a portion of the bottom section of the hopper and the bumper of the vehicle. In still another and/or alternative non-limiting design, the material is at least partially positioned between the back surface of the upper section of the hopper and the tailgate of the vehicle.

In accordance with still another and/or alternative aspect of the invention; a broadcast spreader is positioned at least closely adjacent the base surface of the bottom section of the hopper. The broadcast spreader is designed to spread particulate material from the hopper onto a ground surface. The broadcast spreader can be designed and/or operated to cause a wide variety of different spread patterns of the particulate material onto a ground surface. The broadcast spreader can take a variety of structural forms. The broadcast spreader generally includes a rotatable plate and at least one vane on the upper side of the circular plate. A motor is connected to the rotatable plate to cause the plate to rotate at a set and/or variable speed. The particulate material, upon contacting the rotating plate, is centrifugally propelled outwardly onto a ground surface. In one embodiment of the invention, the broadcast spreader is at least partially connected to the bottom section of the hopper. In another and/or alternative embodiment, the rotation speed of the motor can be controlled at least partially based on the velocity of the vehicle. In still another and/or alternative embodiment, the operation of the motor can be controlled from a remote location. In yet another and/or alternative embodiment, the motor can be used to agitate particulate material in the hopper to facilitate in the dispensement of the particulate material from the hopper onto the broadcast spreader. In one aspect of this embodiment, a shaft from the motor extends upwardly into the hopper and is coupled with an agitator in the hopper to agitate the particulate material in the hopper. The agitation of the particulate material at least partially loosens and breaks up the particulate material so that the particulate material can flow through an opening in the base of the bottom section and onto the broadcast spreader.

In accordance with yet another and/or alternative aspect of the invention, a spreader shield is used to at least partially control the direction of particulate material that is spread by a broadcast spreader. The spreader shield can be designed to direct particulate material discharged from a rotating spreader element onto a desired area of the underlying ground surface. The spreader shield also or alternatively can be designed to reduce the amount of particulate material that is directed toward undesired locations around the broadcast spreader. In one embodiment, the spreader shield is pivotable such that it is adjustable to enable improved selective directing of the particulate material relative to a ground surface. In one aspect of this embodiment, the adjustment of the particulate material discharge of the spreader shield at least partially occurs due to a concentric configuration of the spreader shield relative to the axis of rotation of the rotating plate on the broadcast spreader. As a result, the spreader shield can be moved so as to adjust the resultant broadcast pattern of the particulate material to any one of a number of different patterns. Combining the rotational movement of the spreader shield with the particular configuration of the spreader shield allows for specific particulate material discharge patterns. These patterns can be directed in the desired direction such that the discharge patterns are generally to the right of the vehicle, directly behind the vehicle, or generally to the left of the vehicle. As can be appreciated, other patterns can be selected. In another and/or alternative embodiment of the invention, the spreader shield includes a peripheral wall which is concentric with respect to the discharge axis of the hopper. Such an orientation enhances the adjustment characteristics of the discharge of the particulate material and/or allows for additional variations to the particulate discharge spreader patterns. The concentricity between the spreader shield and the discharge axis of the hopper enables asymmetrical distribution of particulate material about the discharge axis. In still another and/or alternative embodiment of the invention, the spreader shield includes a top wall which is inclined and positioned over the rotating plate of the broadcast spreader. This top wall minimizes the upward distribution of particulate material. The top wall also improves directional control of both lateral and downward broadcasting of the particulate material from the broadcast spreader onto the ground surface.

In accordance with still yet another and/or alternative aspect of the invention, the bottom section of the hopper includes a valving mechanism to at least partially control the amount of particulate material dispensed from the hopper. Generally, the valving mechanism is designed to be closed when spreading of particulate material is not desired. When particulate material is to be spread onto a ground surface, the valving mechanism is opened to allow discharge of material through a opening in the base of the bottom section of the hopper. In one embodiment, the valving mechanism is similar to or the same as the valving mechanism disclosed in U.S. Pat. No. 3,374,956, which is incorporated by reference. In another and/or alternative embodiment, the valving mechanism employs an automatic mechanism for shifting the valving mechanism between an opened and closed position. In one aspect of this embodiment, the automatic valving mechanism is the same as or similar to the valving mechanism disclosed in U.S. Pat. No. 4,166,581, which is incorporated by reference.

In accordance with a further and/or alternative aspect of the invention, the bottom section of the hopper includes a tapered bottom chute terminating in a discharge chamber having a lower discharge opening. The shape of the discharge opening is generally circular; however, other shapes can be used. The tapered bottom feeds the particulate material toward the discharge opening. If an agitator is used in the hopper, the agitator is typically positioned in the tapered portion of the bottom section to facilitate in the movement of the particulate material to the discharge opening. If a broadcast spreader is used, the rotating plate of the broadcast spreader is generally positioned below the discharge opening.

In accordance with a still further and/or alternative aspect of the invention, the retaining arrangement includes at least one band that is positionable at least partially across the front face of the upper section of the hopper. The band is designed to at least partially maintain the back face of the upper section of the hopper against or at least closely adjacent to the tailgate of the vehicle. In one embodiment of the invention, the band is a substantially non-flexible material. Such materials include, but are not limited to, metals, hard plastics, fiberglass, and the like. In another and/or alternative embodiment of the invention, the band is a substantially flexible material. Such materials include, but are not limited to, nylon straps, Kevlar straps and other types of flexible straps; cables; chains; ropes; and the like. As can be appreciated, the term “band” as defined here in is not limited to a narrow strip, but also includes, but is not limited to, rope, chain, cable, wire, straps, and the like. In still another and/or alternative embodiment of the invention, the front face of the upper section of the hopper includes a positioning arrangement to at least partially maintain the band in a particular location on the front face. The positioning arrangement facilitates in ensuring that the hopper is retained in a proper position to properly secure the hopper to the vehicle. In one aspect of this embodiment, the front face of the upper section includes a groove adapted to receive at least a portion of the band to at least partially limit the movement of the band. In another and/or alternative aspect of this embodiment, the front face of the upper section includes at least one rib or ridge to at least partially limit the movement of the band. In still another and/or alternative aspect of this embodiment, the front face of the upper section includes at least one ring, loop, or slot adapted to receive at least a portion of the band to at least partially limit the movement of the band. In yet another and/or alternative aspect of this embodiment, the front face of the upper section includes a releasable connector such as, but not limited to VELCRO, adapted to releasably connect to at least a portion of the band to at least partially limit the movement of the band. In yet another and/or alternative embodiment of the invention, the front face of the upper section of the hopper includes an arcuate surface to increase the force distribution of the band on the front face of the upper section. The increased force distribution reduces the amount of wear on the band and/or reduces the incidence of damage to the hopper caused by the band. In still yet another and/or alternative embodiment of the invention, a band tensioner is adapted to tension the band about the hopper. In a further and/or alternative embodiment of the invention, the band includes a connector adapted to connect to the tailgate, luggage rack, and/or cargo area of the vehicle. In one aspect of this embodiment, the connector includes a hook that can fit in a preexisting opening on the tailgate, about the back surface of the tailgate, in a preexisting opening in the cargo area, in a preexisting latch in the cargo area, in a preexisting opening on the luggage rack, and/or the like. The hook is designed to connect to a location such that little or no modification to the vehicle is necessary to secure the hopper to the vehicle. In one non-limiting design, the hook includes at least one opening and/or notch that is designed to fit over and/or about the a vehicle striker pin and/or striker plate. In another and/or alternative non-limiting arrangement, the hook is designed to be positioned between the tailgate and the inner wall of the truck bed. In still another and/or alternative non-limiting arrangement, the hook is designed to be positioned in one or more openings of a luggage rack and/or in the cargo area (e.g., openings on the top surface of side walls of a truck bed). In another and/or alternative aspect of this embodiment, the connector includes a protective coating and/or is made of a material that limits damage (e.g., scratches, dents, etc.) to the vehicle.

In accordance with a still further and/or alternative aspect of the invention, the retaining arrangement includes at least one rear retainer that at least partially fits over the top of, under the bottom of, and/or at least partially about the tailgate. The rear retainer is designed to at least partially maintain the back face of the upper section of the hopper against or at least closely adjacent to the tailgate of the vehicle. In one embodiment of the invention, the rear retainer is a substantially non-flexible material. Such materials include, but are not limited to, metals, hard plastics, fiberglass, and the like. In another and/or alternative embodiment of the invention, the rear retainer is a substantially flexible material. Such materials include, but are not limited to, nylon straps, Kevlar straps, cables, ropes, and the like. In still another and/or alternative embodiment of the invention, the rear retainer is connected to the upper section of the hopper. In yet another and/or alternative embodiment of the invention, the rear retainer is connected to the bottom section of the hopper. In still yet another and/or alternative embodiment of the invention, a tensioner is used to tension the rear retainer. In a further and/or alternative embodiment of the invention, the rear retainer includes a connector adapted to connect to the tailgate of the vehicle. In one aspect of this embodiment, the connector includes a hook that can fit at least partially about the back surface of the tailgate. The hook is designed to connect to a location such that little or no modification to the vehicle is necessary to secure the hopper to the vehicle. In one aspect of this embodiment, the connector includes a protective coating and/or is made of a material that limits damage (e.g. scratches, dents, etc.) to the vehicle.

In accordance with a still further and/or alternative aspect of the invention, a motor guard or motor shroud is provided on the broadcast spreader. The motor guard is generally designed to at least partially cover and protect the motor from foreign objects during the operation of the broadcast spreader and/or use of the hopper. Typically, the motor is positioned below the rotating plate, thus is located close to the ground when the hopper and broadcast spreader are mounted on a vehicle. The close proximity of the motor to the ground makes the motor more susceptible to damage. The motor guard is designed to at least partially act as a barrier to materials that may damage the motor. In one embodiment, the motor guard substantially covers or encapsulates the motor. In another and/or alternative embodiment of the invention, the motor guard is at least partially connected to the bottom section of the hopper. In one non-limiting design, the motor guard is removably connected to the hopper. In another non-limiting design, the motor guard is not removably connected to the hopper. In still another and/or alternative embodiment of the invention, the motor guard is made of a durable material such as, but not limited to, plastic, metal, fiberglass, and/or the like.

In accordance with a yet a further and/or alternative aspect of the invention, a vibrating device is connected to the hopper to facilitate in providing a substantially uniform flow of particulate material out of the hopper. During the operation of the hopper, particulate material passes through an opening in the base of the bottom section of the hopper. The dispensement of the particulate material out of the hopper commonly results in a conical-like depression in the particulate material in the hopper. If the particulate material in the hopper is not redistributed, slower or no particulate material will flow through the opening, even though particulate material remains in the hopper. When the vehicle travels over a rough surface, the vibrations of the vehicle will typically cause the desired amount of particulate redistribution in the hopper. However, when the vehicle travels over a smoother surface, the vehicle vibrations are less, which in turn can result in significant conical depression formations in the particulate material. The vibrating device that is connected to the hopper facilitates in obtaining the desired amount of particulate redistribution in the hopper. In one embodiment of the invention, the vibrating device is positioned on the inside of the hopper. In another and/or alternative embodiment of the invention, the vibrating device is positioned on the outside of the hopper. In still another and/or alternative embodiment of the invention, the vibrating device is controllably operable. In one aspect of this embodiment, the vibrating device only operates when particulate material is dispensed from the hopper. In another and/or alternative aspect of this embodiment, the vibrating device operates at certain time intervals and/or for a certain amount of time.

In accordance with a still yet a further and/or alternative aspect of the invention, the hopper includes one or more structural components that enhance the structural integrity of the hopper. Such structural components include, but are not limited to, reinforcement bars or rods, structural ribs, structural plates, brackets, etc. In one embodiment, the upper and/or lower section of the hopper includes at least one structural rib formed in a surface of the upper and/or lower section. In one aspect of this embodiment, the structural rib is formed into and made from the same material as the surface of the upper and/or lower section, without the need for a foreign structural reinforcing component.

In accordance with another and/or alternative aspect of the invention, the hopper includes a bumper post. The bumper post is designed to at least partially align, orient and/or retain the base of the bottom section at least partially on the bumper of the vehicle. In one embodiment of the invention, the bumper post extends downwardly from the base of the bottom section. In another and/or alternative embodiment of the invention, the bumper post can be oriented in one or more locations along the base of the bottom section. In still another and/or alternative embodiment of the invention, the bumper post is substantially fixed on the base of the bottom section. In yet another and/or alternative embodiment of the invention, the bumper post is removably connected to the bottom section. In still yet another and/or alternative embodiment of the invention, the bumper post is irremovably connected to the bottom section. In a further and/or alternative embodiment of the invention, the distance that the bumper post extends downwardly from the base can be adjusted. In yet a further and/or alternative embodiment of the invention, the distance that the bumper post extends downwardly from the base is substantially fixed. In still a further and/or alternative embodiment of the invention, the bumper post can be exchanged for other shaped and/or sized bumper posts. In another and/or alternative embodiment of the invention, the bumper post is designed to be at least partially inserted through the bumper of the vehicle and/or one or more components connected to the bumper of the vehicle. When the bumper post is inserted at least partially into the bumper and/or one or more components connected to the bumper, the bumper post facilitates in at least partially maintaining at least a portion of the base of the bottom section on the bumper and/or other components of the vehicle. In one aspect of this embodiment of the invention, the bumper post is designed to be at least partially inserted through an existing hitch ball hole in the rear step of the bumper. In this aspect of the embodiment, the hitch ball is removed from the bumper, and the bumper post is then at least partially inserted into the hitch ball hole, thus no damage is caused to the existing bumper of the vehicle. In another and/or alternative aspect of this embodiment, the bumper post is designed to be at least partially inserted through the existing hitch ball hole of a hitch that is attached to the vehicle. Commonly, the hitch is connected to one or more components of the bumper; however, the hitch can be solely connected to the frame and/or other components of the vehicle. When the bumper post is inserted at least partially into the hitch ball hole, the bumper post facilitates in at least partially maintaining at least a portion of the base of the bottom section on the bumper and/or other components of the vehicle. In still another and/or alternative aspect of this embodiment, the bumper post is designed to be at least partially inserted through the existing hitch ball hole in the rear step of the bumper. In still another and/or alternative embodiment of the invention, the bumper post is designed to be at least partially inserted behind the bumper of the vehicle. When the bumper post is inserted at least partially behind the bumper, the bumper post facilitates in at least partially maintaining at least a portion of the base of the bottom section on the bumper and/or other components of the vehicle. In yet another and/or alternative embodiment of the invention, the bumper post is designed to be at least partially inserted in front of the bumper of the vehicle. When the bumper post is inserted in front of the bumper, the bumper post at least partially functions to orient the bottom section on the bumper and/or other components of the vehicle.

The principal object of the present invention is to provide a spreader mounting assembly which quickly and easily mounts to a vehicle.

Another and/or alternative object of the present invention is to provide a spreader mounting assembly which allows for convenient refilling of the hopper during operation.

Still another and/or alternative object of the present invention is to provide a spreader mounting assembly which minimizes the damage to a vehicle.

Yet another and/or alternative object of the present invention is to provide a spreader mounting assembly which is easy to install and remove.

Still yet another and/or alternative object of the present invention is to provide a spreader mounting assembly that can be mounted to a wide variety of vehicles.

A further and/or alternative object of the present invention is to provide a spreader mounting assembly that eliminates drilling mounting holes in a vehicle.

Still a further and/or alternative object of the present invention is to provide a spreader mounting assembly that eliminates the use of a metal spreader frame to support the hopper on a vehicle.

Yet a further and/or alternative object of the present invention is to provide a spreader mounting assembly that eliminates the use of a welded spreader frame to support the hopper on a vehicle.

Still yet a further and/or alternative object of the present invention is to provide a spreader mounting assembly that eliminates the need to remove the tailgate of a vehicle prior to mounting the spreader to the vehicle.

Another and/or alternative object of the present invention is to provide a spreader mounting assembly that includes a motor shield.

Still another and/or alternative object of the present invention is to provide a spreader mounting assembly that maintains proper flow of particulate material from the hopper.

Yet another and/or alternative object of the present invention is to provide a spreader mounting assembly that includes a vibrating device to at least partially regulate particulate distribution in the hopper.

Still yet another and/or alternative object of the present invention is to provide a spreader mounting assembly that includes a hopper made of a plurality of wall layers.

A further and/or alternative object of the present invention is to provide a spreader mounting assembly that includes a hopper having structural ribs to enhance the structural integrity of the hopper.

Still a further and/or alternative object of the present invention is to provide a spreader mounting assembly that includes a hopper including a bumper post that at least partially aligns, orients and/or retains at least a portion of the base of the bottom section on the bumper and/or other components of the vehicle.

These and other objects and advantages will become apparent to those skilled in the art upon the reading and following of this description taken together with the accompanying drawings.

BRIEF DESCRIPTION OF THE DRAWINGS

Reference may now be made to the drawings, which illustrate one or more embodiments that the invention may take in physical form and in certain parts and arrangements of parts wherein;

FIG. 2A is an enlarged fragmentary perspective showing a viewing window;

FIG. 2B is a section taken on line 2B—2B of FIG. 2A.

DETAILED DESCRIPTION OF THE PREFERRED EMBODIMENTS

Figure 1:
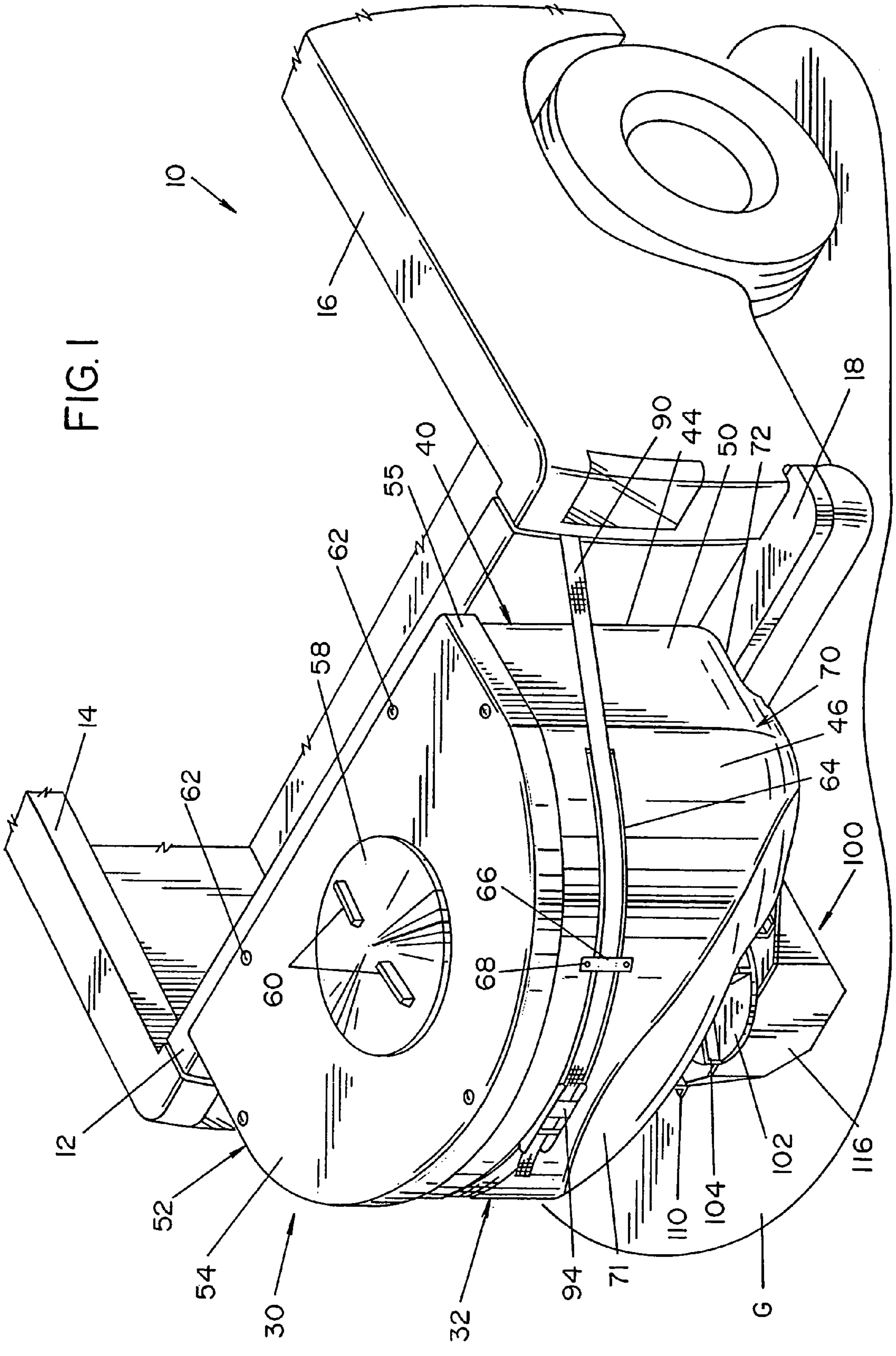
FIG. 1 is a perspective view of the spreader assembly attached to the tailgate of a vehicle.
Figure 2:
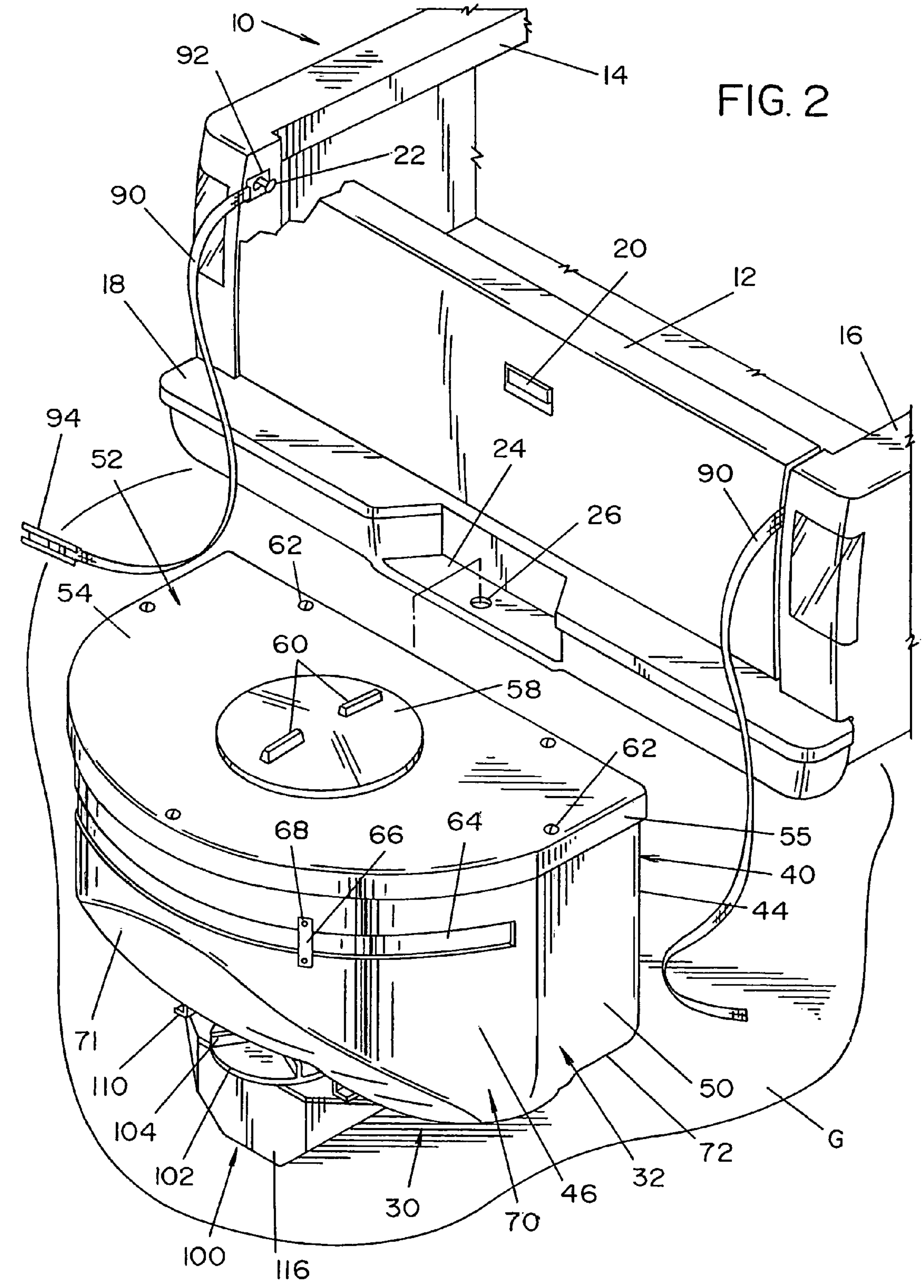
FIG. 2 is a perspective view of the spreader assembly disconnected from the tailgate of a vehicle.
Figure 3:
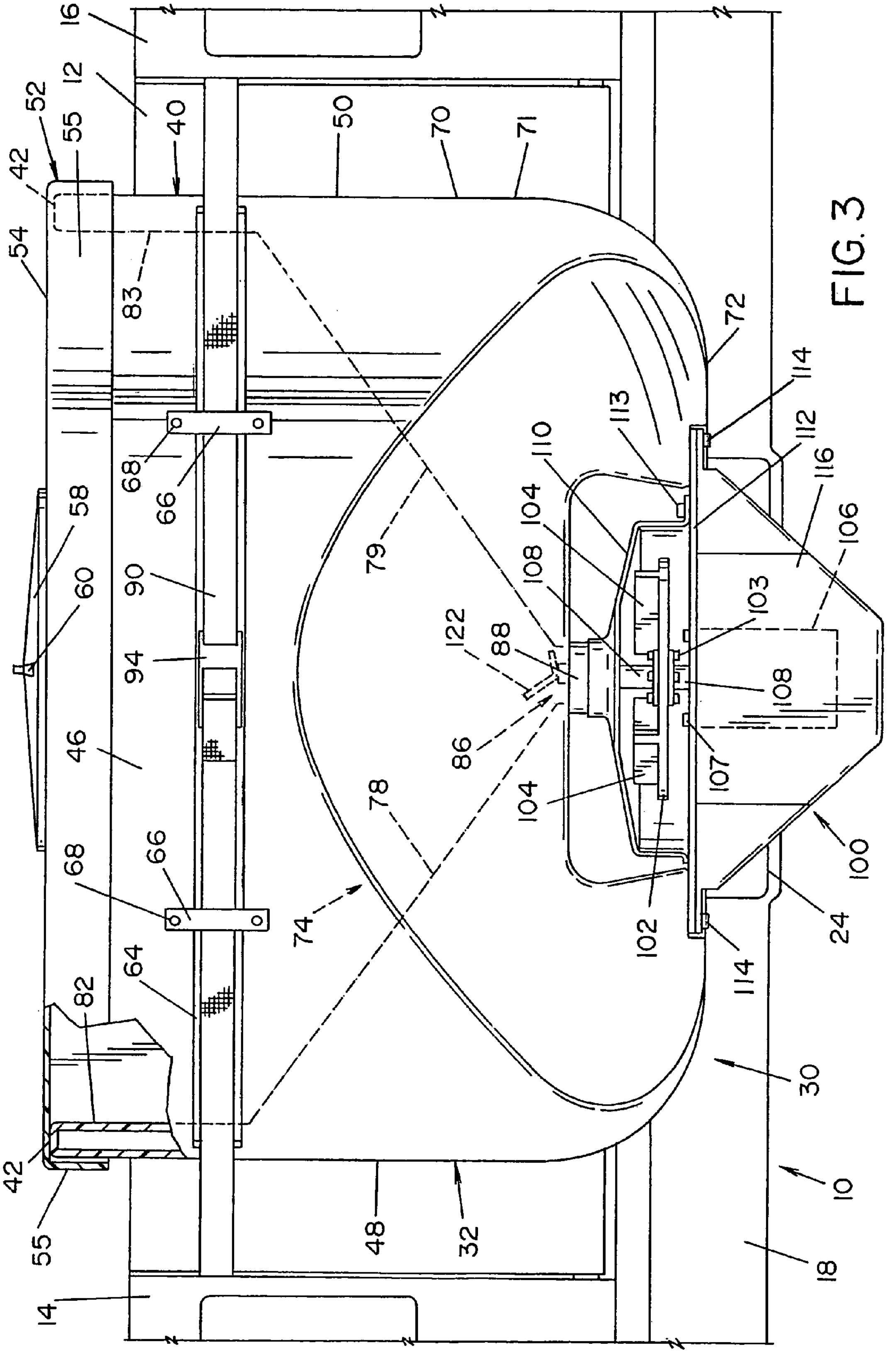
FIG. 3 is a front plan view of the spreader assembly attached to the tailgate of a vehicle.
Figure 4:
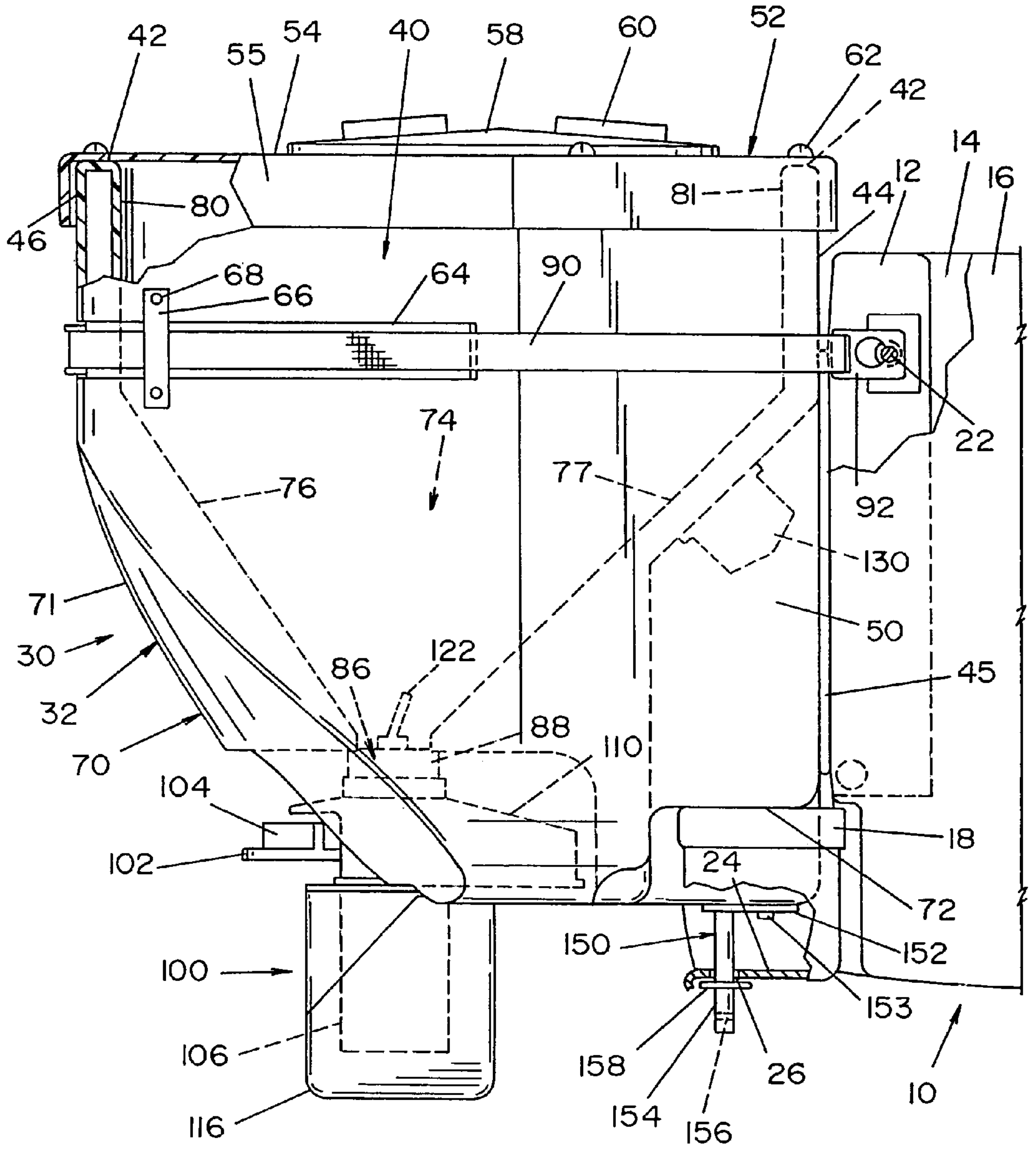
FIG. 4 is a side elevation view of the spreader assembly attached to the tailgate of a vehicle.
Figure 5:
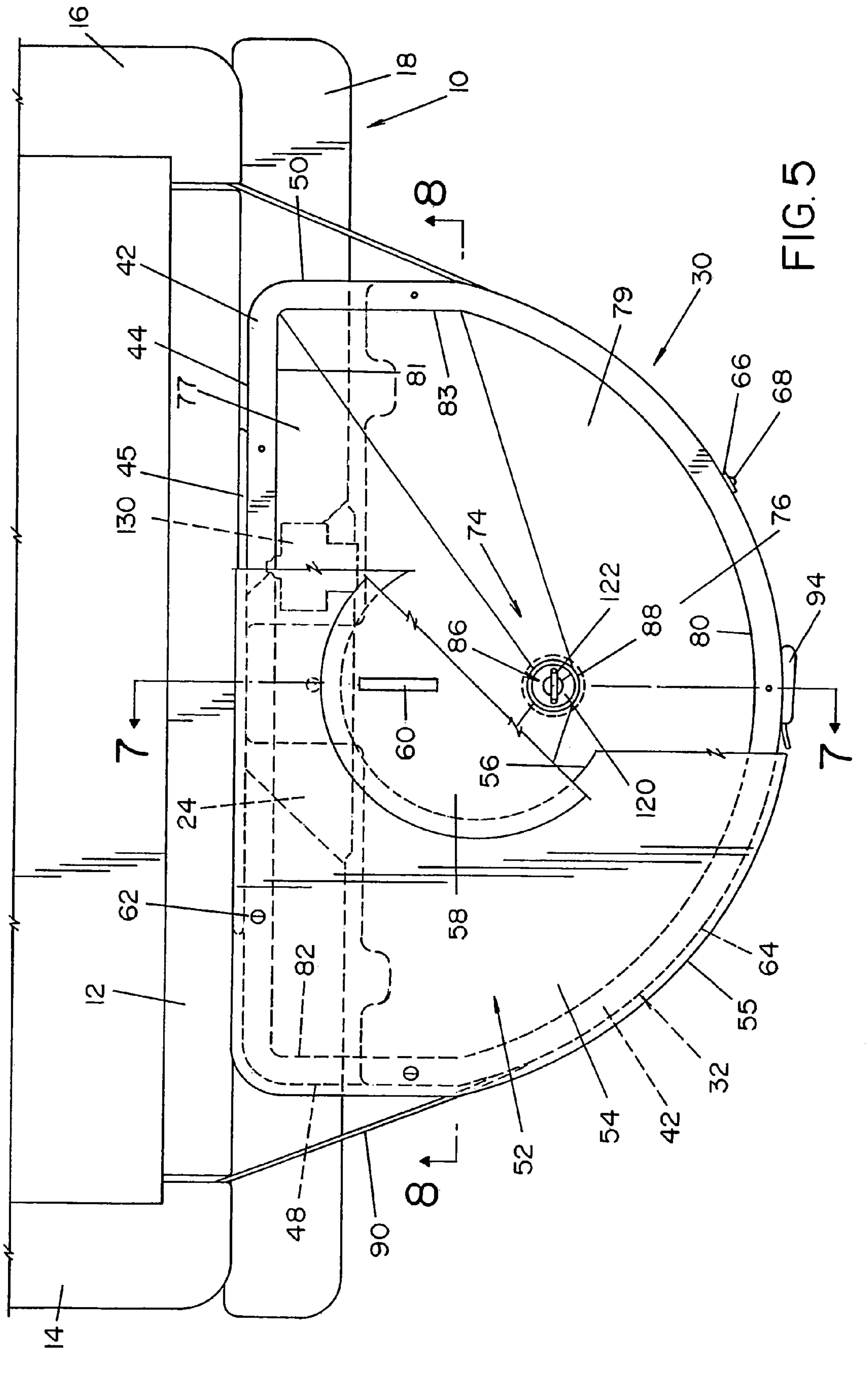
FIG. 5 is a top plan view of the spreader assembly attached to the tailgate of a vehicle.

Referring now to the drawings, wherein the showings are for the purpose of illustrating the preferred embodiments of the invention only and not for the purpose of limiting the same, in FIG. 1 there is shown the tailgate 12 of a vehicle 10 having a spreader assembly 30 attached to the rear of the vehicle. Vehicle 10 includes two side walls 14, 16, and a bumper 18. As illustrated in FIG. 2, the bumper includes a rear step 24 having a hitch ball hole 26. The hitch ball hole is designed to receive a hitch ball, not shown, for use in connecting a trailer or the like to the rear of the vehicle. Tailgate 12 includes a latch 20 that is used to open the tailgate. Striker pins 22 secured to the inside surface of side walls are shown in FIG. 2 and are used to secure the tailgate in the locked position. Vehicle 10 is typically a truck, but may be another type of vehicle such as, but not limited to, an SUV, a station wagon, or any other vehicle having a tailgate. The components of vehicle 10 as herein described are standard components on vehicles of this type.

Referring now to FIGS. 1–9, spreader assembly 30 includes a plastic molded hopper 32 having an upper section 40 and a bottom section 70. Upper section 40 includes a top surface 42, a back face 44, a front face 46, and two side faces 48, 50. Positioned on the top surface is a top lid 52. Top lid 52 includes a top surface 54 and a side flange 55. The top surface includes a fill opening 56 and a cap 58 that is connected in the opening to close the fill opening. Typically, the cap is threaded into the fill opening; however, other configurations can be used to secure the cap in the fill opening. Cap 58 includes a pair of ribs 60 that facilitate in the insertion and/or removal of the cap from the fill opening. The fill opening is typically used to insert particulate material into the interior of the hopper. The fill opening can also be used to inspect and/or allow access to the interior of the hopper. Top lid 52 is designed to be removably connected to the top surface 42 of the upper section of the hopper. The side flange 55 facilitates in the positioning of the top lid on the upper section of the hopper. Screws 62 are used to secure the top lid to the upper section. As can be appreciated, other arrangements can be used to connect the top lid to the upper section. The removal of the top lid from the upper section of the hopper allows access to the interior of the hopper. When desired, the screws can be removed so that the top lid can be removed. Typically, the fill opening is used to fill the hopper with particulate material, and the top lid is removed to inspect, clean and/or service the interior of the hopper.

The sides of the upper section can be used to insert production information about the hopper. The information can include manufacturer information, trademarks, patent information, hopper specifications, serial numbers, and the like. The upper section can include a viewing window 63 that allows an operator to determine the level of the particulate material in the hopper and/or the condition of the particulate material in the hopper. Typically, the viewing window is made of a clear plastic material.

As illustrated in FIGS. 1 and 2, the front face of the upper section includes a band groove 64 designed to receive a portion of a band 90. The band groove maintains the band in position on the front to prevent or inhibit the band from slipping lower on the upper section or slipping off the top of the upper section. Groove retainers 66 are designed to maintain band 90 in band groove 64. The groove retainers traverse the band groove and are secured to the upper section by screws 68. The front face of the upper section is illustrated as being of an arcuate shape. The arcuate shape of the front face allows the forces being applied by the band to the front face of the upper section to be better distributed on the upper section of the hopper. The back face of the upper section is illustrated as being substantially planar so that the back face can be positioned closely adjacent to the front face of the tailgate as illustrated in FIG. 1. Side faces 48, 50 are illustrated as also being substantially planar; however, other shapes can be used.

Band 90 is typically made of a flexible, weather resistant, and durable material such as, but not limited to, nylon, Kevlar, nylon blend material, or the like. Each end of the band includes a hook 92 that is designed to secure to striker pins 22 on the side walls of the vehicle. The hook is designed to be secured to existing components of the vehicle. When the tailgate is closed, the tailgate secures the hooks on the striker pins. As a result, the hook can be easily and securely connected to the vehicle without having to drill holes in the vehicle and/or attach a structure to the vehicle, thereby preventing disfiguration of the vehicle. The hooks may be coated with a material or be made of a material that reduces damage to the vehicle. A band tensioner 94 is used to apply tension to the band to ensure that the substantially flat back face 44 of the upper section is positioned against the tailgate. Any common tensioner can be used. The tensioner can include a lock or latch to prevent inadvertent release of the tensioner.

As illustrated in FIG. 1, the base 72 of the bottom section of the hopper partially rests on the top surface of bumper 18. Base 72 is designed to vertically support much of the weight of the hopper and to transfer such weight to the bumper of the vehicle. The band 90 applies a rearward force to the upper section of the hopper to maintain the flat back face of the upper section against the tailgate. This simple arrangement effectively mounts the hopper to the rear of a vehicle. When the hopper is to be removed, the band tensioner is released to release tension on the band, the band is removed from the front face of the upper section, and the hopper is lifted off the rear of the vehicle and laid on ground G as illustrated in FIG. 2. Band 90 is removed from the vehicle by opening the tailgate by use of latch 20 and then removing hooks 92 from striker pins 22. The tail gate is then reclosed, thereby completing the removal of the spreader assembly from the vehicle. The spreader assembly is remounted to the vehicle by reversing these steps.

Base 72 may include a gripping material to inhibit or prevent the base from slipping off the bumper. Typically, the gripping material is a rubber material; however, other materials can be used.

Referring now to FIGS. 3, 4 and 7–9, the interior of bottom section 70 of the hopper includes a hopper chute 74 defined by four inclined walls 76, 77, 78 and 79. The interior of upper section 40 also includes four walls 80, 81, 82 and 83. The four walls of the upper section are substantially parallel to back face 44, front face 46, and side faces 48, 50. The inner walls of the upper and bottom sections of the hopper provide a multiple wall support for the hopper. This multiple wall support provides additional structural integrity for the hopper. In addition, damage to an outer surface of the upper or bottom section will not necessarily result in a breach of integrity to the interior of the hopper, due to the existence of the inner wall of the hopper. As illustrated in FIGS. 3, 4 and 7–9, the inner walls of the bottom section are spaced from the outer surfaces 71 of the bottom section of the hopper, thus damage to the outer surfaces will not automatically result in damage to the inner walls of the bottom section. Similarly, the inner walls of the upper section are spaced from the front, back and side faces of the upper section of the hopper, thus damage to the faces will not automatically result in damage to the inner walls of the upper section. Typically, the inner walls and outer surfaces of the upper and bottom sections are made of the same material and have generally the same thicknesses; however, inner walls and outer surfaces of the upper and bottom sections can be made of different materials and/or have different thicknesses.

Inner walls 76, 77, 78 and 79 angle toward the bottom of the hopper and terminate at opening 86. The hopper chute is thus designed to direct particulate material toward a broadcast spreader 100 located below opening 86. Opening 86 directs particulate material from the interior of the hopper into a cylindrical tube 88. Positioned in the cylindrical tube is an auger type blade 120 that is designed to draw particulate material through opening 86. The blade also breaks up clumps of particulate material so that the particulate material can pass through the opening and cylindrical tube. Connected to the top of the auger blade is an agitator 122. The agitator is designed to loosen particulate material in the hopper so that the particulate material flows toward the opening in the base of the bottom section. The agitator and auger blade are shown to be connected to the broadcast spreader motor 106.

When the particulate material exits the cylindrical tube, the particulate material falls onto rotating plate 102 of the broadcast spreader. The rotating plate includes vanes 104 that cause the particulate material to be thrown from the rotating plate. The broadcast spreader also includes a shield 110 which directs the particulate material rearwardly of the vehicle. The shield is connected to a base plate 112 by screws 113. The base plate is in turn is connected to base 72 of the hopper by screws 114. The rotating plate is turned by a drive shaft 108 which is in turn rotated by motor 106. Rotating plate 102 is bolted to drive shaft 108 by bolts 103. Motor 106 is also connected to base plate 112 by bolts 107.

The base of the broadcast spreader includes a motor guard 116. The motor guard is connected to base 72 of the hopper by screws 114. The motor guard is designed to protect the motor during the operation of the spreader assembly. The motor guard is typically made of a durable material that resists wear during the operation of the spreader.

Figure 7:
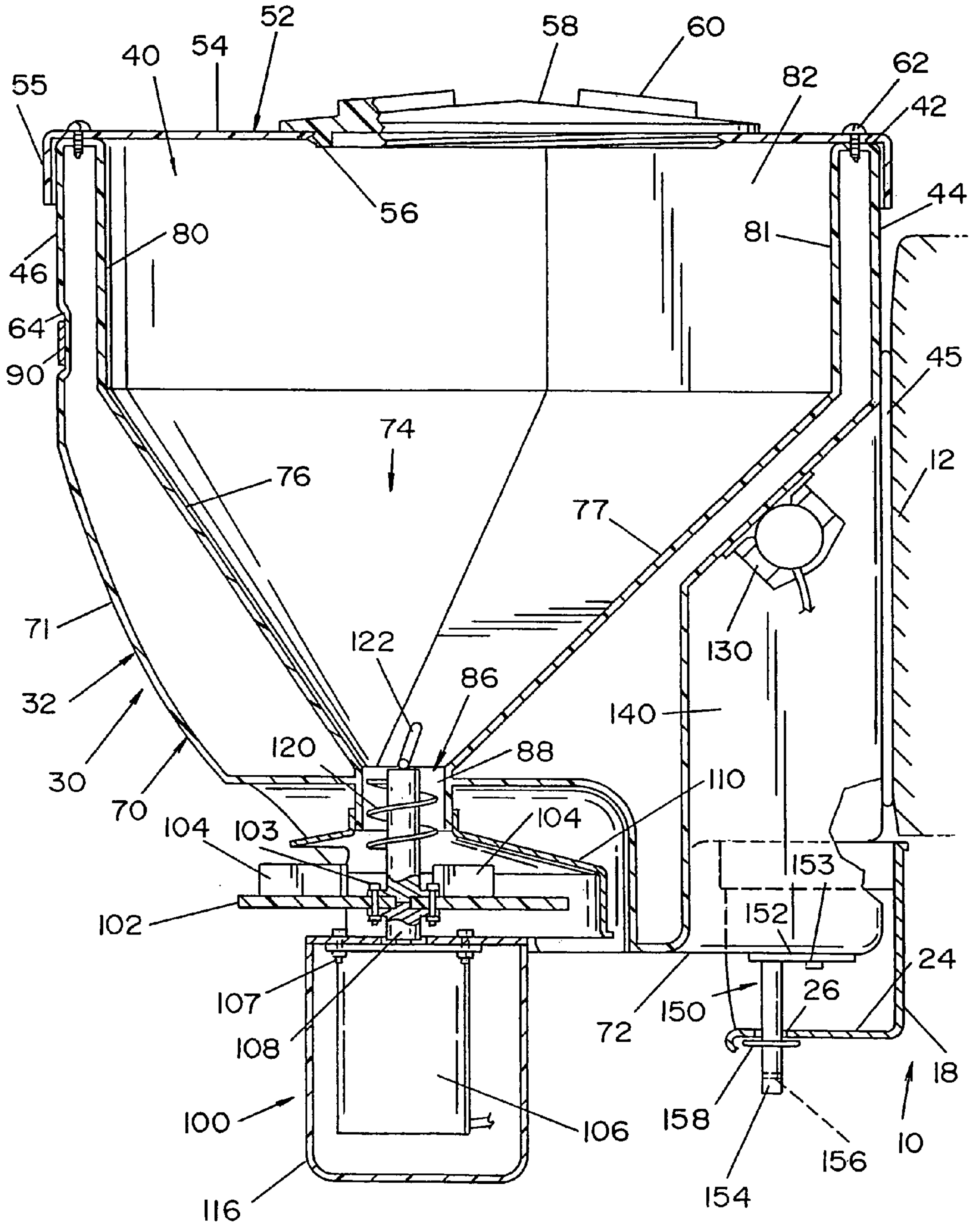
FIG. 7 is a cross-sectional view along line 7—7 of FIG. 5.
Figure 8:
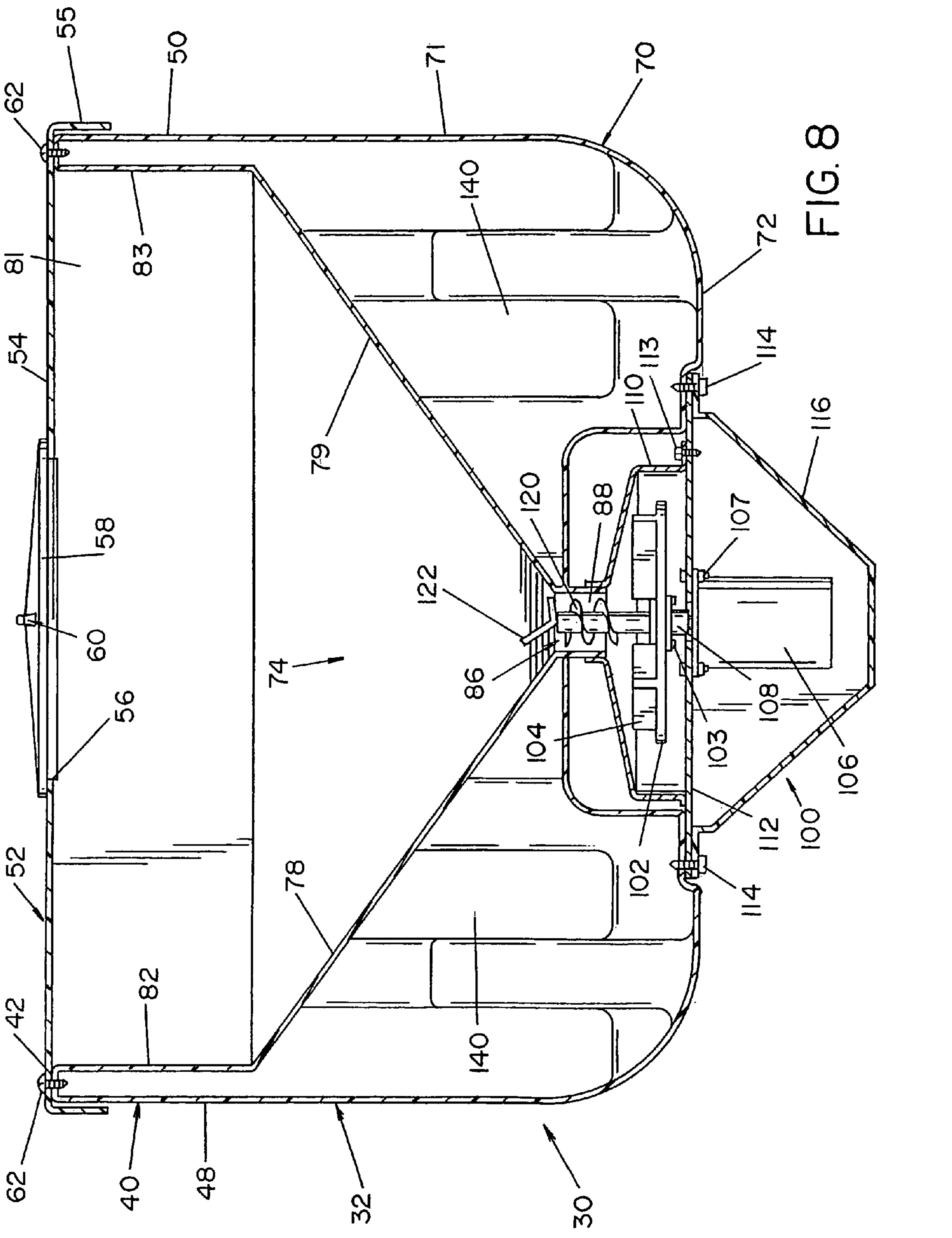
FIG. 8 is a cross-sectional view along line 8—8 of FIG. 5.
Figure 9:
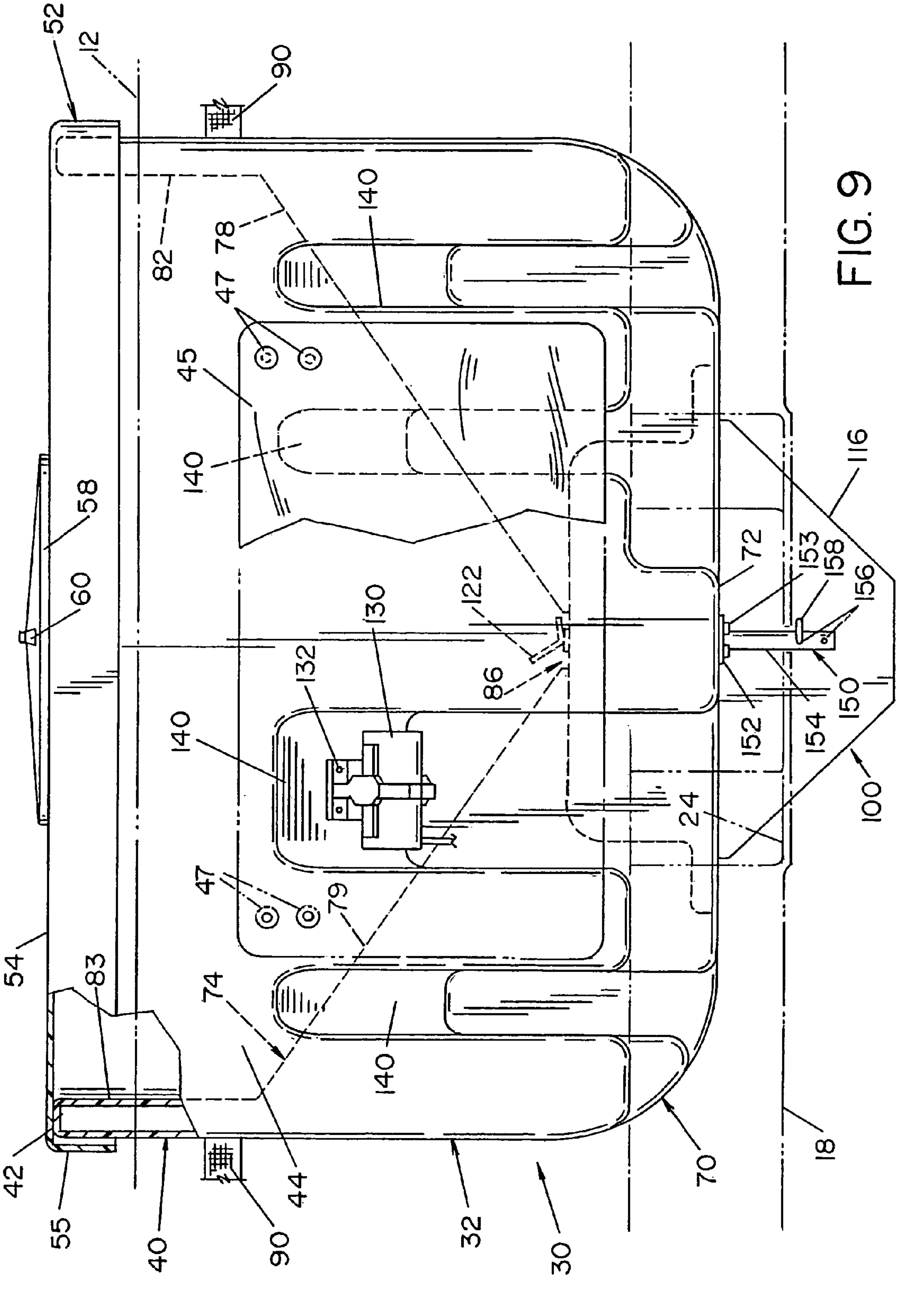
FIG. 9 is a rear plan view of the spreader assembly.

Referring now to FIGS. 7 and 9, a vibrating device 130 is connected to the back face of the upper section by screws 132 and positioned in one of the structural ribs 140 in the back face. The vibrating device is designed to vibrate the hopper so as to proper distribute the particulate material in the hopper and/or to facilitate in causing the particulate material to properly flow into the opening in the base of the bottom section. The vibrating device is typically an electric device. The vibrating device can be manually and/or automatically controlled.

Figure 6:
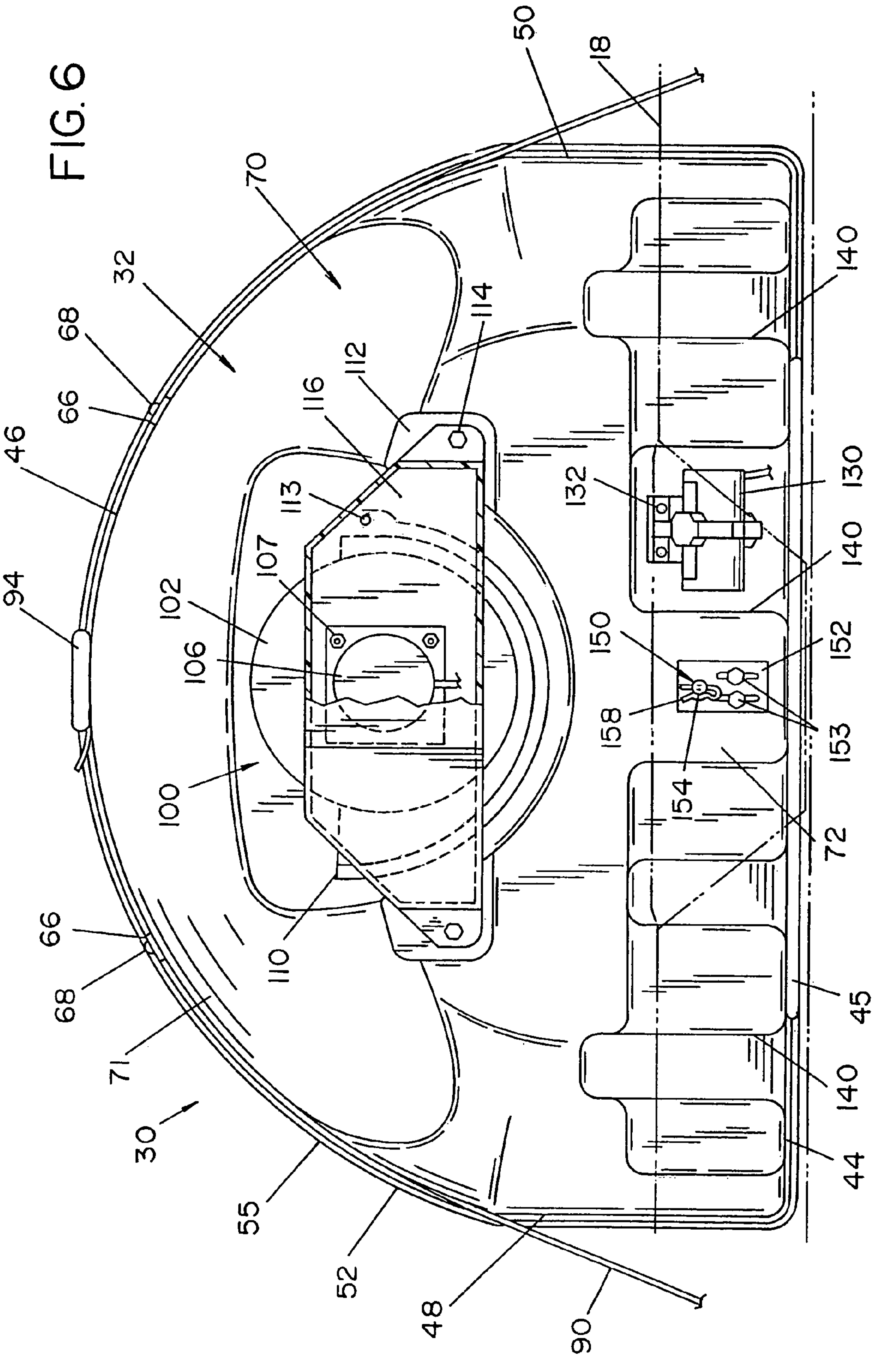
FIG. 6 is a bottom plan view of the spreader assembly attached to the tailgate of a vehicle.

As illustrated in FIGS. 6 and 9, the back face of the upper section and the bottom section includes structural ribs 140. The structural ribs provide rigidity and strength to the hopper. The front of the hopper can also include one or more structural ribs.

Referring now to FIGS. 4, 6, 7 and 9, a bumper post 150 is connected to base 72 of the bottom section. Bumper post 150 includes a base plate 152 and a rod 154 connected to the base plate. The base plate 152 is connected to base 72 by screws 153. Rod 154 includes two openings 156 designed to receive a pin 158. As can be appreciated, rod 154 can include more or less openings. The bumper post is designed to engage the vehicle bumper to align, orient and/or retain the base of the bottom section on the bumper of the vehicle. As illustrated in FIG. 7, rod 154 is at least partially inserted through hitch ball hole 26 on bumper 18. A pin 158 is inserted into an opening 156 in the rod so as to prevent the rod from inadvertently fully retreating through opening 26 during the operation of the spreader. When rod 154 is inserted at least partially into the hitch ball opening, the bumper post facilitates in maintaining the base of the bottom section of the hopper on the bumper.

The invention has been described with reference to a preferred embodiment and alternates thereof. It is believed that many modifications and alterations to the embodiments disclosed will readily suggest themselves to the those skilled in the art upon reading and understanding the detailed description of the invention. It is intended to include all such modifications and alterations insofar as they come within the scope of the present invention.

I claim:

1. An improved spreader for spreading particulate material comprising a hopper having an upper section and a bottom section, said bottom section having a lower material discharge chamber terminating in a lower discharge opening; a broadcast spreader positioned beneath said discharge opening; a motor to rotate at least a portion of said broadcast spreader; a retaining band that at least partially fits about a front face of said upper section; and a bumper post extending downwardly from said bottom section, said bumper post at least partially adapted to at least partially extend into a hitch ball hole in a bumper of a vehicle.

2. The improvement as defined in claim 1, wherein said retaining band is at least partially flexible and releasably connectable to said vehicle, said retaining band adapted to draw said upper section of said hopper toward a tailgate of the vehicle.

3. The improvement as defined in claim 1, wherein said front face of said upper section includes a band retainer adapted to at least partially retain said retaining band on said front face.

4. The improvement as defined in claim 1, including a band tensioner adapted to at least partially tighten said retaining band.

5. The improvement as defined in claim 1, wherein said front face of said upper section includes an arcuate surface.

6. The improvement as defined in claim 1, including a vibrating device connected to said hopper.

7. The improvement as defined in claim 1, wherein said broadcast spreader includes a motor guard that at least partially encapsulates said motor.

8. The improvement as defined in claim 1, wherein said upper section includes a fill opening in a top surface of said upper section.

9. The improvement as defined in claim 8, wherein said fill opening is at least partially closed by a removable cap.

10. The improvement as defined in claim 1, wherein said hopper is a plastic molded unit.

11. The improvement as defined in claim 1, wherein said bottom and upper sections include multiple wall layers.

12. The improvement as defined in claim 1, including a screw mechanism adapted to draw particulate material through said lower discharge opening.

13. The improvement as defined in claim 1, wherein said bottom section includes a gripping surface adapted to at least partially maintain at least a portion of said bottom section on a top surface of said bumper.

14. The improvement as defined in claim 1, wherein said upper section includes a viewing opening.

15. The improvement as defined in claim 1, including at least one hook attached to said retaining band and adapted to connect to a tailgate strike pin of said vehicle.

16. An improved spreader for spreading particulate material comprising a hopper having an upper section and a bottom section, said bottom section having a lower material discharge chamber terminating in a lower discharge opening and a gripping surface adapted to at least partially maintain at least a portion of said bottom section on a top surface of a bumper of a vehicle; a broadcast spreader positioned beneath said discharge opening; a motor to rotate at least a portion of said broadcast spreader; and a retaining band that at least partially fits about a front face of said upper section.

17. The improvement as defined in claim 16, wherein said front face of said upper section includes a band retainer adapted to at least partially retain said retaining band on said front face.

18. The improvement as defined in claim 16, including a band tensioner adapted to at least partially tighten said retaining band.

19. The improvement as defined in claim 16, wherein said front face of said upper section includes an arcuate surface.

20. The improvement as defined in claim 16, including a vibrating device connected to said hopper.

21. The improvement as defined in claim 16, wherein said broadcast spreader includes a motor guard that at least partially encapsulates said motor.

22. The improvement as defined in claim 16, wherein said upper section includes a fill opening in a top surface of said upper section.

23. The improvement as defined in claim 22, wherein said fill opening is at least partially closed by a removable cap.

24. The improvement as defined in claim 16, wherein said hopper is a plastic molded unit.

25. The improvement as defined in claim 16, wherein said bottom and upper sections include multiple wall layers.

26. The improvement as defined in claim 16, including a screw mechanism adapted to draw particulate material through said lower discharge opening.

27. The improvement as defined in claim 16, wherein said upper section includes a viewing opening.

28. The improvement as defined in claim 16, including at least one hook attached to said retaining band and adapted to connect to a tailgate strike pin of said vehicle.

29. The improvement as defined in claim 16, including a post extending downwardly from said bottom section.

30. The improvement as defined in claim 29, wherein said post is at least partially adapted to at least partially extend into a hitch ball hole.

31. An improved spreader for mounting on a vehicle and spreading particulate material comprising a hopper having an upper section and a bottom section, said bottom section having a lower material discharge chamber terminating in a lower discharge opening; a broadcast spreader positioned beneath said discharge opening; a motor to rotate at least a portion of said broadcast spreader; a retaining band that at least partially fits about a front face of said upper section; and a band tensioner adapted to at least partially retain said retaining band.

32. The improvement as defined in claim 31, wherein said front face of said upper section includes an arcuate surface.

33. The improvement as defined in claim 31, wherein said bottom and upper sections include multiple wall layers.

34. The improvement as defined in claim 31, wherein said bottom section includes a gripping surface adapted to at least partially maintain at least a portion of said bottom section on a top surface of a bumper of a vehicle.

35. The improvement as defined in claim 31, including a post extending downwardly from said bottom section.

36. The improvement as defined in claim 35, wherein said post is at least partially adapted to at least partially extend into an opening in a bumper of a vehicle.

37. The improvement as defined in claim 36, wherein said opening in said bumper is a hitch ball hole.

38. An improved spreader for mounting on a vehicle and spreading particulate material comprising a hopper having an upper section and a bottom section, said bottom section having a lower material discharge chamber terminating in a lower discharge opening; a broadcast spreader positioned beneath said discharge opening; a retaining band that at least partially fits about a front face of said upper section; and a hook attached to said retaining band, said hook adapted to receive a striker pin to which a tailgate of the vehicle selectively secures.

39. The improvement as defined in claim 38, including a band tensioner adapted to at least partially tighten said retaining band.

40. The improvement as defined in claim 38, including a post extending downwardly from said bottom section.

41. The improvement as defined in claim 40, wherein said post is at least partially adapted to at least partially extend into an opening in a bumper of said vehicle.

* * * * *